(12) United States Patent
Chon

(10) Patent No.: US 12,055,296 B2
(45) Date of Patent: Aug. 6, 2024

(54) COMBUSTOR NOZZLE, COMBUSTOR, AND GAS TURBINE INCLUDING SAME

(71) Applicant: DOOSAN ENERBILITY CO., LTD., Changwon-si (KR)

(72) Inventor: Mu Hwan Chon, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/057,517

(22) Filed: Nov. 21, 2022

(65) Prior Publication Data
US 2023/0272911 A1 Aug. 31, 2023

(30) Foreign Application Priority Data

Jan. 28, 2022 (KR) .......................... 10-2022-0013237

(51) Int. Cl.
| | |
|---|---|
| *F23R 3/28* | (2006.01) |
| *F02C 7/22* | (2006.01) |
| *F23R 3/10* | (2006.01) |
| *F23R 3/34* | (2006.01) |
| *F23R 3/46* | (2006.01) |

(52) U.S. Cl.
CPC .............. *F23R 3/286* (2013.01); *F02C 7/222* (2013.01); *F23R 3/10* (2013.01); *F23R 3/34* (2013.01); *F23R 3/46* (2013.01); *F05D 2220/32* (2013.01); *F05D 2240/35* (2013.01)

(58) Field of Classification Search
CPC .................................. F23R 3/286; F23R 3/14
See application file for complete search history.

(56) References Cited

U.S. PATENT DOCUMENTS

| | | | |
|---|---|---|---|
| 3,720,058 A | 3/1973 | Collinson et al. | |
| 7,513,098 B2 * | 4/2009 | Ohri | F23R 3/14 60/737 |
| 7,610,759 B2 * | 11/2009 | Yoshida | F23R 3/286 60/737 |

(Continued)

FOREIGN PATENT DOCUMENTS

| | | |
|---|---|---|
| CN | 212362096 U | 1/2021 |
| CN | 212537915 U | 2/2021 |

(Continued)

OTHER PUBLICATIONS

EP EESR, dated Jun. 13, 2023.

*Primary Examiner* — Ted Kim
(74) *Attorney, Agent, or Firm* — Harvest IP Law, LLP

(57) ABSTRACT

A combustor nozzle including nozzle modules, a combustor, and a gas turbine including the same are proposed. The nozzle module includes a fuel supply pipe having an internal fuel flow path, manifolds communicating with the fuel supply pipe and arranged in a row in a radial direction, and fuel mixers disposed along a circumferential direction at the rear side of the manifold to receive the fuel from the manifold and inject the fuel, each of the plurality of fuel mixers including a mixer body having one end communicating with the manifold, the other end that is opened, and an mixing flow path through which air and the fuel flow, an air inlet port formed on a lateral side of the mixer body, a fuel port formed inside the mixer body and discharging the fuel supplied from the manifold to the mixing flow path, and an extension located at the other end of the mixer body.

19 Claims, 12 Drawing Sheets

(56) References Cited

U.S. PATENT DOCUMENTS

| | | | |
|---|---|---|---|
| 8,904,798 B2 * | 12/2014 | Manoharan | F23R 3/286 60/737 |
| 9,353,950 B2 * | 5/2016 | Uhm | F23R 3/10 |
| 10,775,047 B2 | 9/2020 | Horikawa | |
| 2002/0078690 A1 | 6/2002 | Stuttaford | |
| 2004/0060301 A1 * | 4/2004 | Chen | F23R 3/286 60/776 |
| 2007/0000228 A1 | 1/2007 | Ohri | |
| 2009/0123882 A1 * | 5/2009 | Eroglu | F23R 3/286 431/278 |
| 2011/0138815 A1 | 6/2011 | Headland | |
| 2016/0033133 A1 | 2/2016 | Johnson | |
| 2016/0146469 A1 | 5/2016 | Lum | |
| 2017/0074521 A1 | 3/2017 | Horikawa | |
| 2017/0159561 A1 * | 6/2017 | Shershnyov | F23R 3/286 |
| 2018/0128491 A1 | 5/2018 | Boardman | |
| 2018/0149364 A1 * | 5/2018 | Berry | F23R 3/286 |
| 2018/0187603 A1 | 7/2018 | Berry | |
| 2020/0072466 A1 | 3/2020 | Akiyama | |

FOREIGN PATENT DOCUMENTS

| | | |
|---|---|---|
| EP | 1918638 A1 | 5/2008 |
| JP | 49-21515 A | 2/1974 |
| JP | 2564022 B2 | 12/1996 |
| JP | 2759722 B2 | 5/1998 |
| JP | 2006029677 A | 2/2006 |
| JP | 2006105488 A | 4/2006 |
| JP | 2009109180 A | 5/2009 |
| JP | 2009250604 A | 10/2009 |
| JP | 2011232023 A | 11/2011 |
| JP | 2016035358 A | 3/2016 |
| JP | 2019207049 A | 12/2019 |
| JP | 6805355 B2 | 12/2020 |
| JP | 2021169913 A | 10/2021 |
| KR | 20160071792 A | 6/2016 |
| KR | 101807586 A | 1/2018 |

* cited by examiner

COMBUSTOR NOZZLE, COMBUSTOR, AND GAS TURBINE INCLUDING SAME

CROSS REFERENCE TO RELATED APPLICATION

The present application claims priority to Korean Patent Application No. 10-2022-0013237, filed on Jan. 28, 2022, the entire contents of which are incorporated herein for all purposes by this reference.

BACKGROUND OF THE INVENTION

1. Field of the Invention

The present disclosure relates to a combustor nozzle, a combustor, and a gas turbine and, more particularly, to a combustor nozzle including a plurality of nozzle modules, a combustor, and a gas turbine including the same.

2. Description of the Background Art

A gas turbine is a combustion engine in which a mixture of air compressed by a compressor and fuel is combusted to produce a high temperature gas, which drives a turbine. The gas turbine is used to drive electric generators, aircraft, ships, trains, or the like.

The gas turbine generally includes a compressor, a combustor, and a turbine. The compressor serves to intake external air, compress the air, and transfer the compressed air to the combustor. The compressed air compressed by the compressor has a high temperature and a high pressure. The combustor serves to mix compressed air from the compressor and fuel and combust the mixture of compressed air and fuel to produce combustion gases, which are discharged to the gas turbine. The combustion gases drive turbine blades in the turbine to produce power. The power generated through the above processes is applied to a variety of fields such as generation of electricity, driving of mechanical units, etc.

Fuel is injected through nozzles disposed in respective combustors, wherein the fuel includes gaseous fuel and liquid fuel. In recent years, in order to suppress the emission of carbon dioxide, use of hydrogen fuel or a fuel containing hydrogen is recommended.

However, since hydrogen has a high combustion rate, when such fuels are burned with a gas turbine combustor, the flame formed in the gas turbine combustor approaches and heats the structure of the gas turbine combustor, thereby degrading the reliability of the gas turbine combustor.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a combustor nozzle capable of improving mixing characteristics of fuel and air to minimize the generation of nitrogen oxide and increase flame stability, a combustor, and a gas turbine including the same.

In an aspect of the present disclosure, there is provided a combustor nozzle including a plurality of nozzle modules.

The nozzle module includes a fuel supply pipe, a plurality of manifolds, and a plurality of fuel mixers. The fuel supply pipe has an internal fuel flow path through which fuel flows from the front side to the rear side. The plurality of manifolds communicate with the fuel supply pipe and are arranged in a row in a radial direction so that air flow paths are respectively formed at positions therebetween. The plurality of fuel mixers is disposed along the circumferential direction at the rear side of the manifold to receive the fuel from the manifold and injects the fuel. each of the plurality of fuel mixers includes a mixer body, an air inlet port, a fuel port, and an extension. The mixer body has one end, which is the forward end, communicating with the manifold, the other end, which is the rearward end, that is opened, and an mixing flow path through which air and the fuel flow. The air inlet port is formed on a lateral side of the mixer body so that the air is introduced upstream of the mixing flow path. The fuel port is formed inside the mixer body and discharges the fuel supplied from the manifold to the mixing flow path. The extension is located at the other end of the mixer body and includes an extension part whose flow cross-sectional area increases as the extension part extends downstream of the mixing flow path.

In an embodiment, the air inlet port may include a plurality of air inlet slits passing through the mixer body and extending in the longitudinal direction of the mixer body.

In an embodiment, the air inlet port may be provided with a plurality of guides to guide the air, and the air inlet slits may be formed between the plurality of guides.

In an embodiment, the guide may be provided with a vane portion inclined with respect to the central direction to swirl the incoming air.

In an embodiment, a first fuel port communicating with the manifold and injecting the fuel upstream of the mixing flow path may be disposed in the guide.

In an embodiment, a first fuel plenum communicating with the manifold may be formed in an internal space defined by a sidewall of the mixer body, and a first fuel port communicating with the first fuel plenum and injecting the fuel upstream of the mixing flow path may be disposed on an inner side of the mixing body.

In an embodiment, a plurality of first fuel ports may be provided so as to be disposed in a circumferential direction and/or in an axial direction on the inner side of the mixer body.

In an embodiment, a second fuel plenum communicating with the manifold may be formed in an internal space defined by a sidewall of the mixer body, and a second fuel port communicating with the second fuel plenum is disposed between the air inlet port and the extension to inject the fuel into the mixing flow path.

In an embodiment, the second fuel plenum may be formed in an annular shape at the sidewall of the mixer body.

In an embodiment, a plurality of second fuel ports may be provided so as to be disposed in a circumferential direction and/or in an axial direction on the inner side of the mixer body.

In an embodiment, the combustor nozzle may include a third fuel port passing through the center of a front end of the mixer body to allow the manifold and the mixing flow path to communicate with each other.

In an embodiment, the nozzle module may further include a branch pipe communicating with the fuel supply pipe and the manifold and having an air inlet opening communicating with the air inlet flow path.

In an embodiment, the plurality of nozzle modules may be disposed along the circumferential direction to form a circle as a whole, and the plurality of air inlet flow paths may be arranged in a concentric annular shape as a whole.

In an embodiment, the plurality of nozzle modules may be composed of a plurality of outer nozzle modules circumferentially arranged in an annular shape as a whole, and a central nozzle module disposed at the center on the inner side of the outer nozzle modules.

In an embodiment, a plurality of fuel mixers may be arranged in a generally fan shape in the outer nozzle module, and another plurality of fuel mixers may be arranged in a generally circular shape in the central nozzle module.

In another aspect of the present disclosure, there is provided a combustor including a combustor nozzle and a duct assembly. The combustor nozzle includes a plurality of nozzle modules. The duct assembly is coupled to one side of the combustor nozzle. In the duct assembly, fuel and air are combusted, and combustion gases are delivered to a turbine. The nozzle module includes a fuel supply pipe, a plurality of manifolds, and a plurality of fuel mixers. The fuel supply pipe has an internal fuel flow path through which the fuel flows from the front side to the rear side. The plurality of manifolds communicate with the fuel supply pipe and are arranged in a row in a radial direction so that air flow paths are respectively formed at positions therebetween. The plurality of fuel mixers is disposed along the circumferential direction at the rear side of the manifold to receive fuel from the manifold and injects the fuel. Each of the plurality of fuel mixers includes a mixer body, an air inlet port, a fuel port, and an extension. The mixer body has one end, which is the forward end, communicating with the manifold, the other end, which is the rearward end, that is opened, and an mixing flow path through which the air and the fuel flow. The air inlet port is formed on a lateral side of the mixer body so that the air is introduced upstream of the mixing flow path. The fuel port is formed inside the mixer body and discharges the fuel supplied from the manifold to the mixing flow path. The extension is located at the other end of the mixer body and has a flow cross-sectional area that increases as the extension part extends downstream of the mixing flow path.

In an embodiment, the duct assembly may include a liner having an internal combustion chamber, and a flow sleeve disposed to surround the liner to form an annular flow space therebetween with an end cover disposed on the front side thereof, and the combustor nozzle may further include a plurality of guide tubes coupled to the front end of the liner and respectively disposed at positions corresponding to the plurality of fuel mixers.

In an embodiment, each of the plurality of fuel mixers may be coupled to one of the plurality of guide tubes, respectively.

In an embodiment, the plurality of fuel mixers may be disposed to be spaced apart from the plurality of guide tubes, respectively.

In a further aspect of the present disclosure, there is provided a gas turbine including a compressor, a combustor, and a turbine. The compressor compresses air introduced from the outside. The combustor mixes the compressed air compressed in the compressor and fuel and combusts an air-fuel mixture. The turbine includes a plurality of turbine blades to be rotated by combustion gases combusted in the combustor. The combustor includes a combustor nozzle and a duct assembly. The combustor nozzle includes a plurality of nozzle modules. The duct assembly is coupled to one side of the combustor nozzle. In the duct assembly, the fuel and the air are combusted, and combustion gases are delivered to a turbine. The nozzle module includes a fuel supply pipe, a plurality of manifolds, and a plurality of fuel mixers. The fuel supply pipe has an fuel flow path through which fuel flows from the front side to the rear side. The plurality of manifolds communicate with the fuel supply pipe and are arranged in a row in a radial direction so that air flow paths are respectively formed at positions therebetween. The fuel mixer is disposed along the circumferential direction at the rear side of the manifold to receive the fuel from the manifold and injects the fuel. Each of the plurality of fuel mixers includes a mixer body, an air inlet port, a fuel port, and an extension. The mixer body has one end communicating with the manifold, the other end that is opened, and an mixing flow path through which the air and the fuel flow. The air inlet port is formed on a lateral side of the mixer body so that the air is introduced upstream of the mixing flow path. The fuel port is formed inside the mixer body and discharges the fuel supplied from the manifold to the mixing flow path. The extension is located at the other end of the mixer body and has a flow cross-sectional area that increases as the extension part extends downstream of the mixing flow path.

According to the combustor nozzle, the combustor, and the gas turbine including the same, the plurality of nozzle modules each including the plurality of fuel mixers each having the mixer body and the air inlet port are provided so that the mixing characteristics of fuel and air are advantageously improved to minimize the generation of nitrogen oxide and increase flame stability.

DETAILED DESCRIPTION OF THE INVENTION

Figure 1:
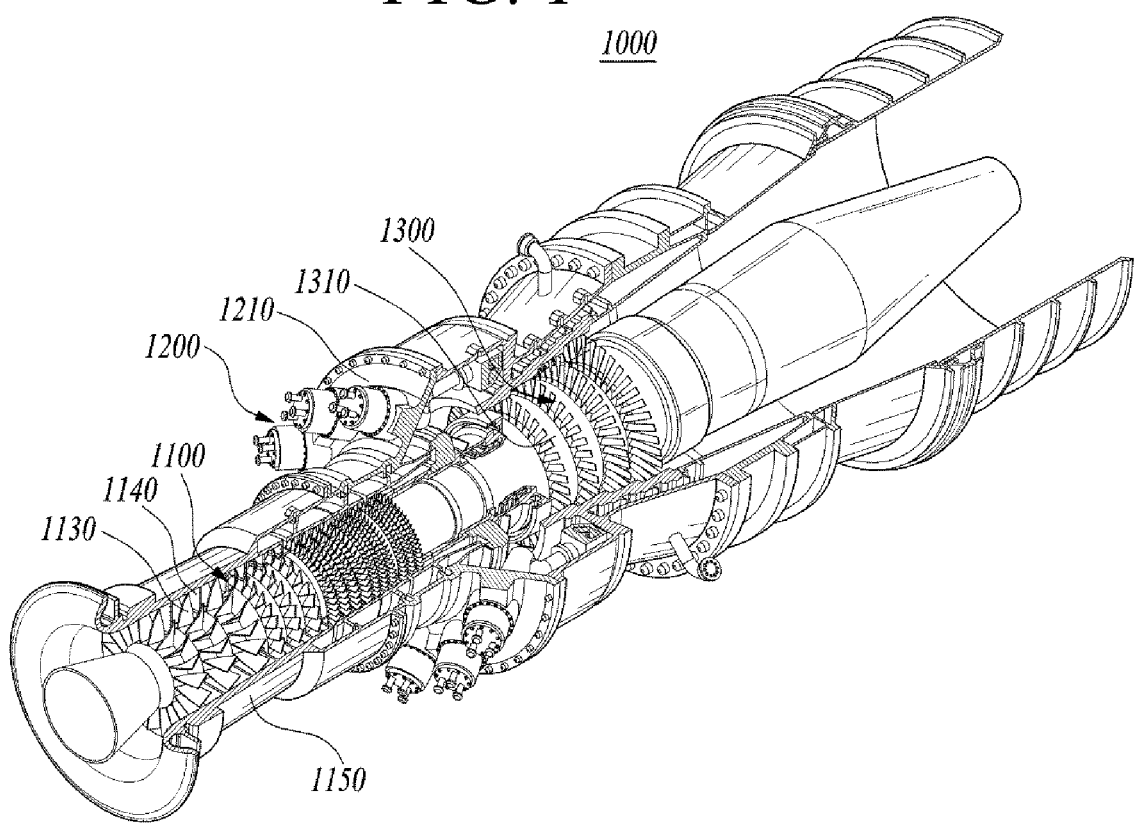
FIG. 1 is a view illustrating the interior of a gas turbine according to an embodiment of the present disclosure.

Hereinafter, exemplary embodiments of the present disclosure will be described in detail with reference to the accompanying drawings. However, it should be noted that the present disclosure is not limited thereto, but may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the terms "comprising" or "including" specifies the presence of stated features, numbers, steps, operations, elements, parts, or combinations thereof, but does not preclude the presence or addition of one or more other features, numbers, steps, operations, elements, parts, or combinations thereof. Hereinafter, preferred embodiments of the present disclosure will be described in detail with reference to the accompanying drawings.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Hereinafter, a combustor nozzle, a combustor, and a gas turbine including the same according to the present disclosure will be described.

Figure 2:
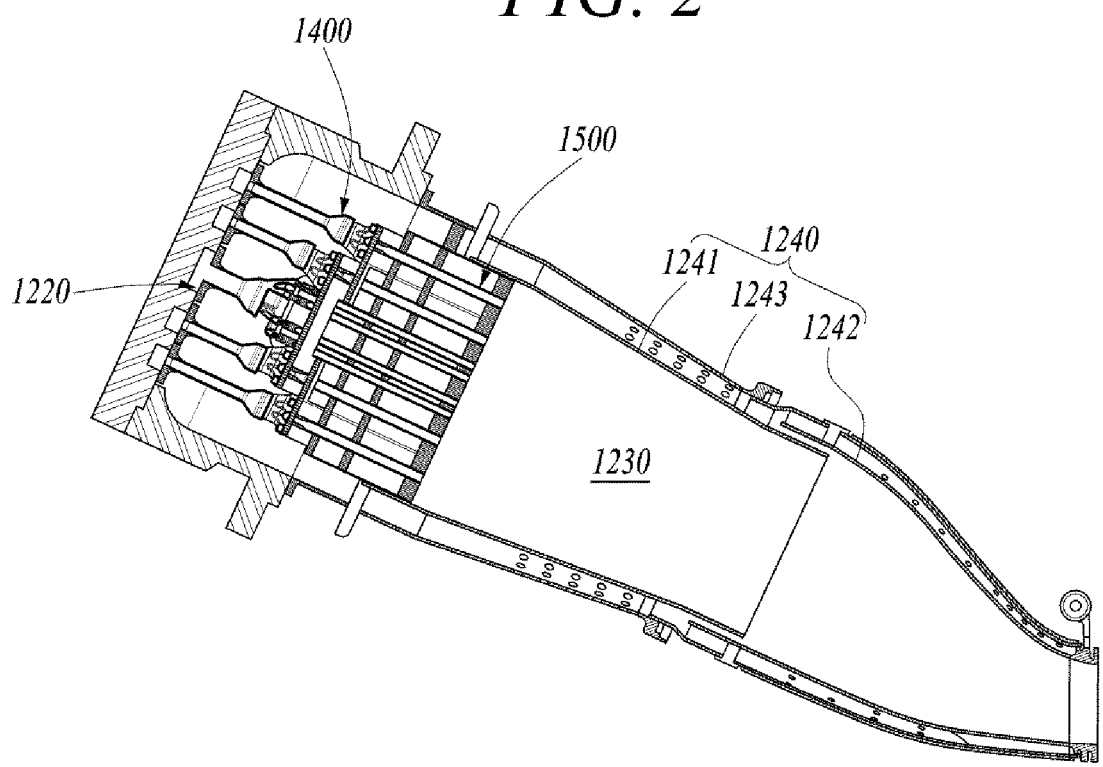
FIG. 2 is a sectional view illustrating a combustor of FIG. 1.

FIG. 1 is a view illustrating the interior of a gas turbine according to an embodiment of the present disclosure, and FIG. 2 is a view illustrating a combustor of FIG. 1.

The gas turbine will now be described with reference to FIGS. 1 and 2.

An ideal thermodynamic cycle of a gas turbine 1000 according to the present embodiment follows a Brayton cycle. The Brayton cycle consists of four thermodynamic processes: isentropic compression (adiabatic compression), isobaric combustion, isentropic expansion (adiabatic expansion) and isobaric heat ejection. That is, in the Brayton cycle, atmospheric air is sucked and compressed into high pressure air, mixed gas of fuel and compressed air is combusted at constant pressure to discharge heat energy, heat energy of hot expanded combustion gas is converted into kinetic energy, and exhaust gases containing remaining heat energy is discharged to the outside. That is, gases undergo four thermodynamic processes: compression, heating, expansion, and heat ejection.

As illustrated in FIG. 1, the gas turbine 1000 employing the Brayton cycle includes a compressor 1100, a combustor 1200, and a turbine 1300. Although the following description will be described with reference to FIG. 1, the present disclosure may be widely applied to other turbine engines similar to the gas turbine 1000 illustrated in FIG. 1.

Referring to FIG. 1, the compressor 1100 of the gas turbine 1000 may suck and compress air. The compressor 1100 may serve both to supply the compressed air by compressor blades 1130 to a combustor 1200 and to supply the cooling air to a high temperature region of the gas turbine 1000. Here, since the sucked air undergoes an adiabatic compression process in the compressor 1100, the air passing through the compressor 1100 has increased pressure and temperature.

The compressor 1100 is usually designed as a centrifugal compressor or an axial compressor, and the centrifugal compressor is applied to a small-scale gas turbine, whereas a multi-stage axial compressor is applied to a large-scale gas turbine 1000 illustrated in FIG. 1 since the large-scale gas turbine 1000 is required to compress a large amount of air.

In this case, in the multi-stage axial compressor, the compressor blades 1130 of the compressor 1100 rotate according to the rotation of the rotor disks to compress the introduced air and move the compressed air to the compressor vanes 1140 on the rear stage. As the air passes through the compressor blades 1130 formed in multiple stages, the air is compressed to a higher pressure.

The compressor vanes 1140 are mounted inside the housing 1150 in stages. The compressor vanes 1140 guide the compressed air moved from the front side compressor blades 1130 toward the rear-side compressor blades 1130. In one embodiment, at least some of the compressor vanes 1140 may be mounted so as to be rotatable within a predetermined range for adjustment of an air inflow, or the like.

The compressor 1100 may be driven using a portion of the power output from the turbine 1300. To this end, as illustrated in FIG. 1, the rotary shaft of the compressor 1100 and the rotary shaft of the turbine 1300 may be directly connected. In the case of the large-scale gas turbine 1000, almost half of the output produced by the turbine 1300 may be consumed to drive the compressor 1100. Accordingly, improving the efficiency of the compressor 1100 has a direct effect on improving the overall efficiency of the gas turbine 1000.

The turbine 1300 includes a rotor disk 1310 and a plurality of turbine blades and turbine vanes radially disposed on the rotor disk 1310. The rotor disk 1310 has a substantially disk shape on which a plurality of grooves is formed. The grooves are formed to have curved surfaces, and turbine blades and turbine vanes are inserted into the grooves. The turbine vanes are fixed against rotation and guide a flow of combustion gases through the turbine blades. The turbine blades are rotated by combustion gases to generate rotational force.

On the other hand, the combustor 1200 serves to mix the compressed air supplied from an outlet of the compressor 1100 with fuel and combust the mixture at constant pressure to produce hot combustion gases. FIG. 2 illustrates an example of the combustor 1200 provided in the gas turbine 1000. The combustor 1200 may include a combustor casing 1210, nozzles 1220, and a duct assembly 1240.

The combustor casing 1210 may have a substantially circular cylindrical shape in which the nozzles 1220 are surrounded. The nozzle 1220 is disposed downstream of the compressor 1100 and may be disposed along the annular combustor casing 1210. Each nozzle 1220 is provided with at least one nozzle module 1400, through which fuel and air are mixed in an appropriate ratio and injected to achieve a suitable state for combustion.

The gas turbine 1000 may use a gas fuel, in particular, a fuel containing hydrogen. The fuel may include a hydrogen fuel alone or a fuel containing hydrogen and natural gas.

The duct assembly is provided to connect the nozzles 1220 and the turbine 1300 so that the hot combustion gas flows therethrough to heat the duct assembly, whereas the compressed air flows towards the nozzles 1220 along an outer surface of the duct assembly 1240, thereby properly cooling the heated duct assembly 1240.

The duct assembly 1240 may include a liner 1241 and a transition piece 1242, and a flow sleeve 1243. The duct assembly 1240 has a double structure in which the flow sleeve 1243 surrounds the outside of the liner 1241 and the transition piece 1242, so that compressed air penetrates into an annular space inside the flow sleeve 1243 to cool the liner 1241 and the transition piece 1242.

The liner 1241 is a tube member connected to the nozzles 1220 of the combustor 1200, wherein an internal space of the liner 1241 defines the combustion chamber 1230. A longitudinal one side of the liner 1241 is coupled to the nozzle 1220, and the other side of the liner 1241 is coupled to the transition piece 1242.

The transition piece 1242 is connected an inlet of the turbine 1300 to guide the hot combustion gas toward the turbine 1300. A longitudinal one side of the transition piece 1242 is coupled to the liner 1241, and the other side of the transition piece 1242 is coupled to the turbine 1300. The flow sleeve 1243 serves to protect the liner 1241 and the transition piece 1242 while avoiding direct exhaust of hot air to the outside.

Figure 3:
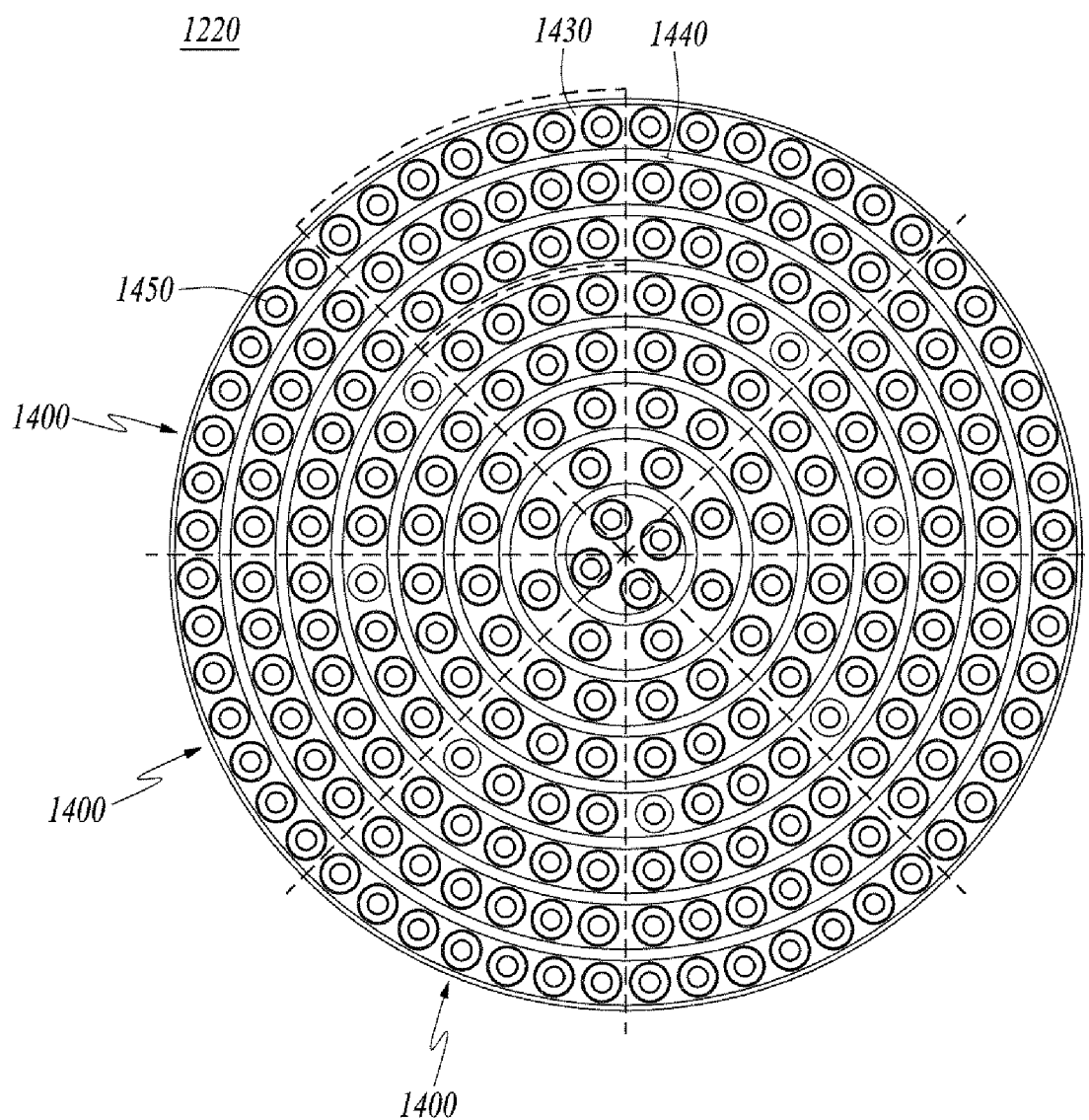
FIG. 3 is a front view illustrating a combustor nozzle according to a first embodiment of the present disclosure.
Figure 4:
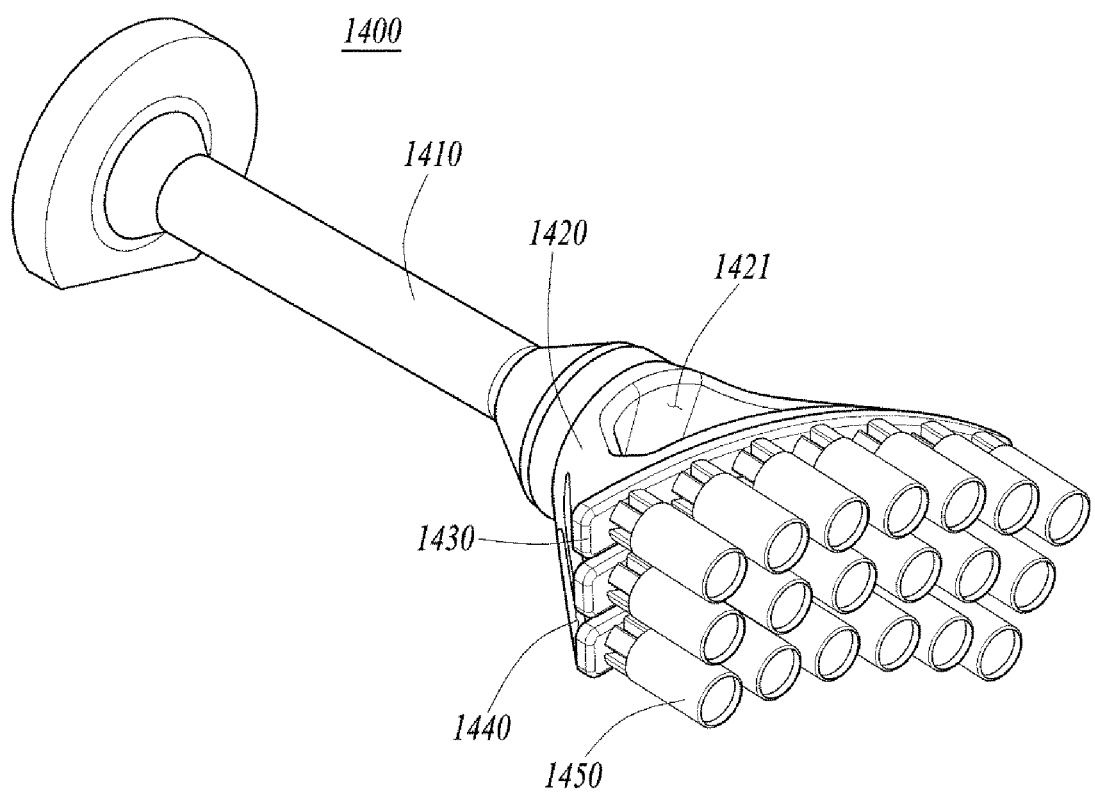
FIG. 4 is a perspective view illustrating a nozzle module according to a first embodiment of the present disclosure.
Figure 5:
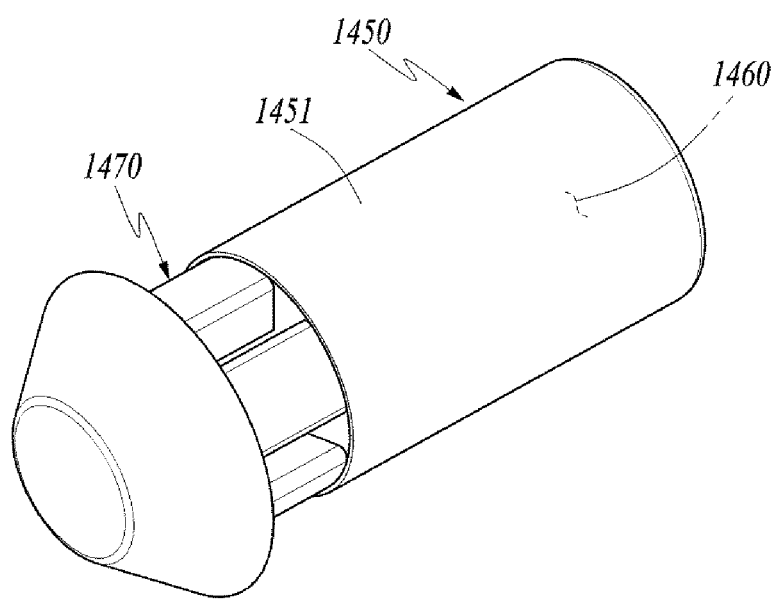
FIG. 5 is a perspective view illustrating a fuel mixer of the nozzle module according to the first embodiment of the present disclosure.
Figure 6:
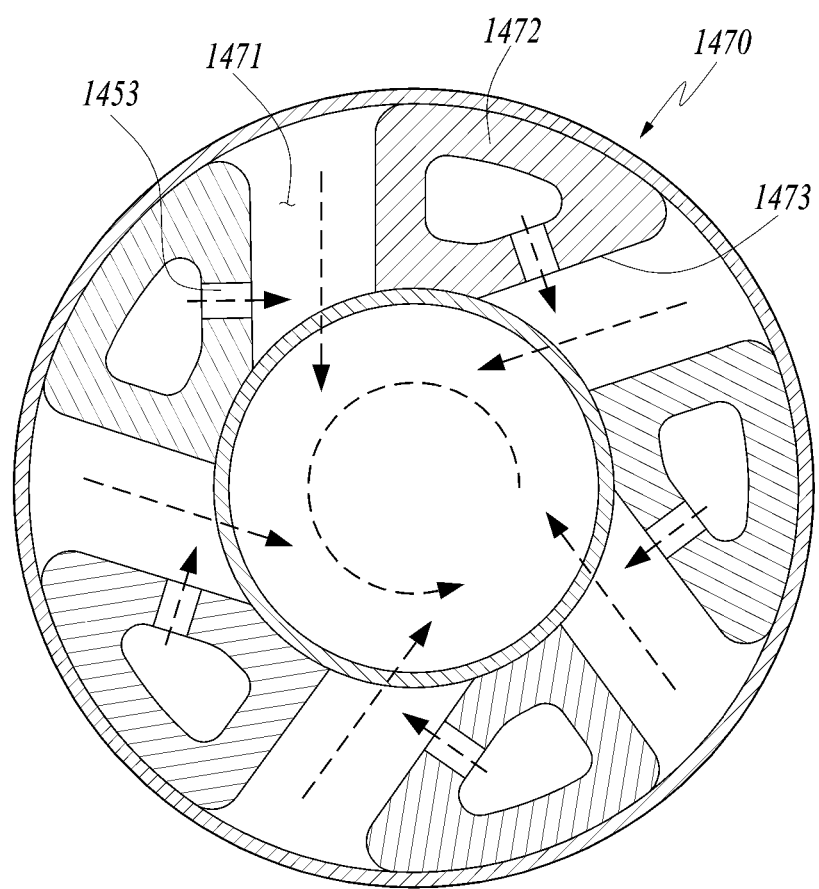
FIG. 6 is a cross-sectional view illustrating the fuel mixer of FIG. 5 on an air inlet port side.
Figure 7:
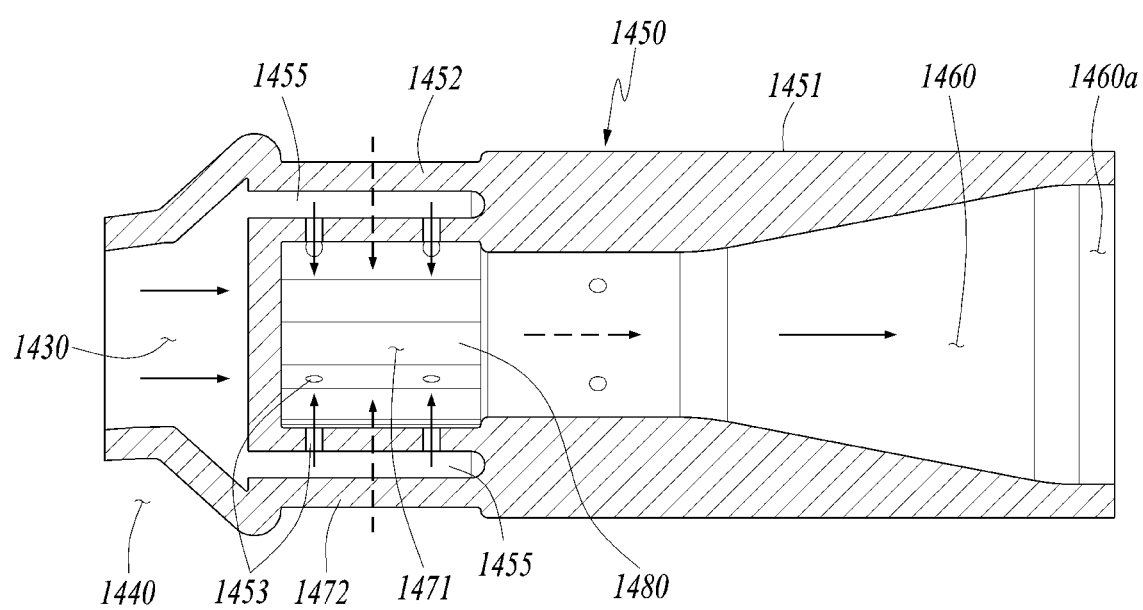
FIG. 7 is a longitudinal sectional view illustrating the fuel mixer of FIG. 5.

FIG. 3 is a front view illustrating a combustor nozzle according to a first embodiment of the present disclosure, FIG. 4 is a perspective view illustrating a nozzle module according to a first embodiment of the present disclosure, FIG. 5 is a perspective view illustrating a fuel mixer of the nozzle module according to the first embodiment of the present disclosure, FIG. 6 is a cross-sectional view illustrating the fuel mixer of FIG. 5 on an air inlet port side, and FIG. 7 is a longitudinal sectional view illustrating the fuel mixer of FIG. 5.

Hereinafter, the combustor nozzle 1220 according to the first embodiment of the present disclosure will be described in detail with reference to FIGS. 3 to 7. The combustor nozzle 1220 according to the first embodiment of the present disclosure includes a plurality of nozzle modules 1400. The nozzle module 1400 includes a fuel supply pipe 1410, a plurality of manifolds 1430, and a plurality of fuel mixers 1450.

The fuel supply pipe 1410 is a tubular member for supplying fuel. A fuel flow path is formed in the fuel supply pipe 1410 so that fuel flows from the front side to the rear side therethrough. A flange (not shown) may be disposed at a front end of the fuel supply pipe 1410 so that fuel may be introduced into the front end of the fuel supply pipe 1410 through the flange (not shown). An extension part (not shown) may be disposed at a rear end of the fuel supply pipe 1410. The extension part is a portion in which a flow cross-sectional area increases toward the rear end. When the extension part (not shown) is disposed, there is an advantage in that the flow resistance during flowing of fuel toward the manifold 1430 to be described later is reduced.

A plurality of manifolds 1430 is disposed at the rear end of the fuel supply pipe 1410 such that the manifolds are in communication with the rear end of the fuel supply pipe 1410. The plurality of manifolds 1430 are provided to communicate with one fuel supply pipe 1410. According to an embodiment, the manifolds 1430 may be arranged in a row in a radial direction. In addition, an air inlet flow path 1440 is formed between the manifolds 1430. The manifolds 1430 may be formed in a fan shape or an annular shape, so the air inlet flow paths 1440 formed between the manifolds 1430 may also be formed in an annular shape.

According to an embodiment, a branch pipe 1420 may be further disposed between the fuel supply pipe 1410 and the plurality of manifolds 1430. The branch pipe 1420 is configured to allow one fuel supply pipe 1410 to communicate with the plurality of manifolds 1430. The branch pipe 1420 has a front end communicating with the fuel supply pipe 1410, and a rear end branching from the front end to communicate with the plurality of manifolds 1430.

According to an embodiment, an air inlet (opening) 1421 may be formed in the branch pipe 1420. The opening 1421 may be formed so as to be opened at a lateral side of the branch pipe 1420. Alternatively, the opening 1421 may be formed in the upper side of the branch pipe 1420 as illustrated in FIG. 4. However, the example of the opening 1421 in FIG. 4 is only an example of the opening 1421, and the position of the opening 1421 is not limited thereto. The opening 1421 of the branch pipe 1420 may communicate with the air inlet flow paths 1440 formed between the plurality of manifolds 1430. In the duct assembly 1240, compressed air flowing in an inner annular space of the flow sleeve 1243 may be introduced into the opening 1421 of the branch pipe 1420, and then flow through the air inlet flow paths 1440.

According to an embodiment, a plurality of fuel mixers 1450 are disposed on the manifold 1430. The fuel mixers 1450 may be disposed along the circumferential direction on one manifold 1430. As a result, in one nozzle 1220, the plurality of fuel mixers 1450 may be disposed along the radial and circumferential directions. As such, when the plurality of fuel mixers 1450 are disposed on one fuel supply pipe 1410, there is an advantage in that the structure is simplified and the fuel mixers 1450 can be easily assembled, disassembled, and inspected.

According to an embodiment, each of the fuel mixers 1450 includes a mixer body 1451, an air inlet port 1470, at least one of fuel ports 1453 and 1454, and an extension 1460. The mixer body 1451 is formed such that one end communicates with the manifold 1430 and the other end is opened. The mixer body 1451 is formed extending in the longitudinal direction from one end to the other end, and has an internal mixing flow path 1480 through which air and fuel flow. In the mixing flow path 1480 of the mixer body 1451, air is introduced, fuel that has sequentially passed through the fuel supply pipe 1410 and the manifold 1430 is injected, and the air is mixed with the fuel and the mixture is discharged to the outside through the opening at the other end of the mixer body 1451. Here, air is introduced into the mixing flow path 1480 through the air inlet port 1470 to be described later, and fuel is injected into the mixing flow path 1480 through fuel ports 1453 and 1454 to be described later.

According to an air inlet port 1470 is formed on a lateral side of the mixer body 1451. In the air inlet port 1470, the air passing through the opening 1421 and the air inlet flow path 1440 is introduced upstream, or into a front end, of the mixing flow path 1480 of the mixer body 1451. In this case, the air inlet port 1470 may be disposed at one end, for example, at a front end, of the mixer body 1451. The air inlet port 1470 may be formed as a hole passing through the mixer body 1451, or may be formed in a shape including air inlet slits 1471.

According to an embodiment, an air inlet port 1470 may include air inlet slits 1471. The air inlet slit 1471 may be formed in the form of an elongated hole. Specifically, the air inlet slit 1471 may be formed to extend in the lengthwise or longitudinal direction of the mixer body 1451 while passing through the mixer body 1451. In addition, a plurality of air inlet slits 1471 may be formed at regular intervals along the circumferential direction in the mixer body 1451.

According to an embodiment, a plurality of guides 1472 may be disposed in the air inlet port 1470. The guide 1472 is configured to guide a flow of air introduced into the air inlet port 1470. The plurality of guides 1472 may be arranged at regular intervals along the circumferential direction of the mixer body 1451 in the mixer body 1451. The guide 1472 may be formed to extend long in the lengthwise or longitudinal direction of the mixer body 1451. In addition, air inlet slits 1471 are respectively formed between adjacent guides 1472. Accordingly, in the air inlet port 1470, the guides 1472 and the air inlet slits 1471 may be alternately disposed along the circumferential direction of the mixer body 1451.

According to an embodiment, a vane portion 1473 may be formed on the guide 1472. The vane portion 1473 is configured to swirl air introduced into the guide 1472. In order to swirl the air, the surface of the vane portion 1473 may be inclined with respect to a direction toward the center of the mixer body 1451 and the center of the mixing flow path 1480. That is, the surface of the vane portion 1473 may be inclined so that the extension line thereof is deviated from the center of the mixer body 1451 and the center of the mixing flow path 1480. Accordingly, according to the embodiment, the air guided by the vane portion 1473 is guided to a place spaced apart from the center of the mixer body 1451 and the center of the mixing flow path 1480, so that the air swirls in the mixing flow path 1480. According to an embodiment, a first lateral surface of the vane portion and a second lateral surface of the adjacent vane portion, facing the first later surface and forming a channel of the air inlet slit 1471 therebetween, may be formed such that they are parallel to each other and such that the direction of the channel of the air inlet slit 1471 is inclined with respect to the direction toward the center of the mixer body 1451 and the center of the mixing flow path 1480. As the air is introduced while swirling, the mixing degree of air and fuel in the mixing flow path 1480 may be improved.

According to an embodiment, at least one of the fuel ports 1453 and 1454 are configured to inject fuel into the mixing flow path 1480 of the mixer body 1451. The fuel ports 1453 and 1454 are formed inside the mixer body 1451 and discharge fuel supplied from the fuel supply pipe 1410 and the manifold 1430 to the mixing flow path 1480. The fuel ports 1453 and 1454 may include a first fuel port 1453.

The first fuel port 1453 is a fuel port that communicates with the manifold 1430 and injects fuel upstream of the mixing flow path 1480. That is, the first fuel port 1453 is formed in a portion closer to one end, which is the forward end of the mixer body, than the other end, which is the rearward end of the mixer body 1451.

According to an embodiment, the mixer body 1451 may include a sidewall portion 1452. The sidewall portion 1452 of the mixer body 1451 has a predetermined thickness and forms an outer shape of the mixer body 1451 in which an internal mixing flow path 1480 is formed. A first fuel plenum 1455 may be formed in an internal space defined by the sidewall portion 1452. The first fuel plenum 1455 is a space that is formed by the sidewall portion 1452 so as to communicate with the manifold 1430. The sidewall portion 1452 may have a double wall structure. Accordingly, fuel supplied from the manifold 1430 may flow into the first fuel plenum 1455 to fill the first fuel plenum 1455. The first fuel plenum 1455 may be formed on the upstream side of the mixing flow path 1480 in the mixer body 1451. That is, the first fuel plenum 1455 may be formed at a position closer to one end than the other end of the mixer body 1451.

According to an embodiment, the air inlet port 1470 includes the guide 1472, the first fuel plenum 1455 may be formed inside the guide 1472. The first fuel plenum 1455 may be formed in at least a portion of the guide 1472, or may be formed to extend further toward the other end of the mixer body 1451 completely beyond the guide 1472 in the axial direction toward the rear end of the mixer body 1451.

According to an embodiment, the first fuel port 1453 may be disposed to communicate with the first fuel plenum 1455. In this case, fuel introduced into the manifold 1430 may be injected upstream of the mixing flow path 1480 through the first fuel plenum 1455 and the first fuel port 1453. When the first fuel plenum 1455 is formed in the guide 1472, the first fuel port 1453 may be formed in the guide 1472. In this case, since fuel is injected from the guide 1472, air and fuel may simultaneously meet and mix at the air inlet port 1470 of the mixing flow path 1480. In addition, since the air inlet slits 1471 are respectively formed between the guides 1472, there is an advantage that air and fuel are mixed more smoothly because an air inlet site and a fuel injection site overlap each other.

According to an embodiment, the first fuel port 1453 may be inclined in the circumferential direction and/or the axial direction. When the first fuel port 1453 is inclined in the circumferential direction, the first fuel port 1453 may be inclined in a direction parallel to or perpendicular to or oblique to an air inflow direction of the air inlet port 1470. Accordingly, it is possible to improve the mixing degree of air and fuel. In addition, the first fuel port 1453 may be formed to be inclined along the axial direction or the longitudinal direction of the mixer body 1451. In this case, the flow resistance in the mixing flow path 1480 may decrease and the flow rate may increase.

According to an embodiment, the plurality of first fuel ports 1453 may be provided so as to be disposed along the circumferential direction and/or the axial direction on the inner side of the mixer body 1451. When the first fuel ports 1453 are disposed in the circumferential direction in the mixer body 1451, the first fuel ports 1453 may be disposed in each of the guides 1472. In addition, when the first fuel ports 1453 are disposed along the axial direction in the mixer body 1451, the first fuel ports 1453 may be arranged in a row in the axial direction in one guide 1472.

According to an embodiment, the extension 1460 may be disposed in the opening at the rear end of the mixer body 1451. The extension 1460 is formed so that the flow cross-sectional area increases as the extension extends downstream of the mixing flow path 1480. The extension 1460 may be formed to extend from the central portion of the mixer body 1451 to the outer end of the mixer body 1451. In addition, the extension 1460 may be formed such that the thickness of the sidewall portion 1452 gradually decreases while maintaining the outer diameter of the mixer body 1451 to be constant from one end to the other end of the mixer body 1451. When the extension 1460 is disposed at the other end, i.e., the rear end, of the mixer body 1451, an air-fuel mixture is diffused while passing the extension 1460 so that the mixing degree of air and fuel can be improved. Meanwhile, a straight section (1460a) in which the flow cross-sectional area is maintained may be partially formed at a distal portion of the other end of the mixer body 1451 in the extension 1460. When the extension 1460 includes the straight section 1460a, the straightness of the air-fuel mixture may be improved.

In the combustor nozzle 1220 according to the first embodiment of the present disclosure, a plurality of nozzle modules 1400 may be disposed along the circumferential direction, forming, collectively, a circular shape as a whole. That is, the plurality of nozzle modules 1400 are arranged so that the front surface of the combustor nozzle 1220 may be formed in a circular shape. In addition, a plurality of air inlet flow paths 1440 of each of nozzle modules 1400 may be arranged to form an annular flow path in the nozzle 1220. At this time, the front side of the nozzle module 1400 may be formed in a form of a sector or a sector whose center is cut.

In addition, as the nozzle 1220 is composed of a plurality of nozzle modules 1400, there is an advantage in that the nozzle 1220 can be manufactured in various sizes and shapes and the nozzle 1220 can be easily assembled, disassembled, and inspected. In addition, since the plurality of nozzle modules 1400 can be controlled individually or in groups, there is an advantage in that the nozzle can be operated in various combustion modes.

Meanwhile, according to an embodiment, a plurality of guide tubes 1500 may be further disposed in bundles in the nozzle 1220. The guide tube 1500 may be coupled to a front end of the liner 1241 of the duct assembly 1240. The guide tube 1500 communicates with the combustion chamber 1230. The plurality of guide tubes 1500 may be provided in a number corresponding to that of the plurality of fuel mixers 1450, and the guide tubes 1500 may be respectively disposed at positions corresponding to the fuel mixers 1450. The air-fuel mixture mixed in the fuel mixer 1450 is guided to the combustion chamber 1230 along the guide tube 1500, and may be further mixed while flowing in the guide tube 1500. The length of the guide tube 1500 may be determined in consideration of the possibility of backfire of a flame generated in the combustion chamber 1230 and the mixing degree of air and fuel.

According to an embodiment, when the guide tubes 1500 are further disposed in the nozzle 1220, the fuel mixers 1450 may be respectively coupled to the guide tubes 1500. At this time, the guide tube 1500 may be inserted into the extension 1460 of the fuel mixer 1450, or the other end, i.e., the rear end, of the mixer body 1451 may be inserted into the guide tube 1500. If the other end of the mixer body 1451 is inserted into the guide tube 1500, according to an embodiment, only a portion excluding the air inlet port may be inserted into the guide tube 1500. As such, when the fuel mixer 1450 is inserted into the guide tube 1500, the air-fuel mixture injected from the fuel mixer 1450 may be stably injected into the guide tube 1500.

Meanwhile, according to an embodiment, when the guide tubes 1500 are not further disposed in the nozzle 1220, the other end, i.e., the rear end, of the mixer body 1451 of the fuel mixer 1450 may be disposed in the combustion chamber 1230 of the liner 1241. In this case, the air-fuel mixture in the fuel mixer 1450 may be directly injected into the combustion chamber 1230.

Figure 8:
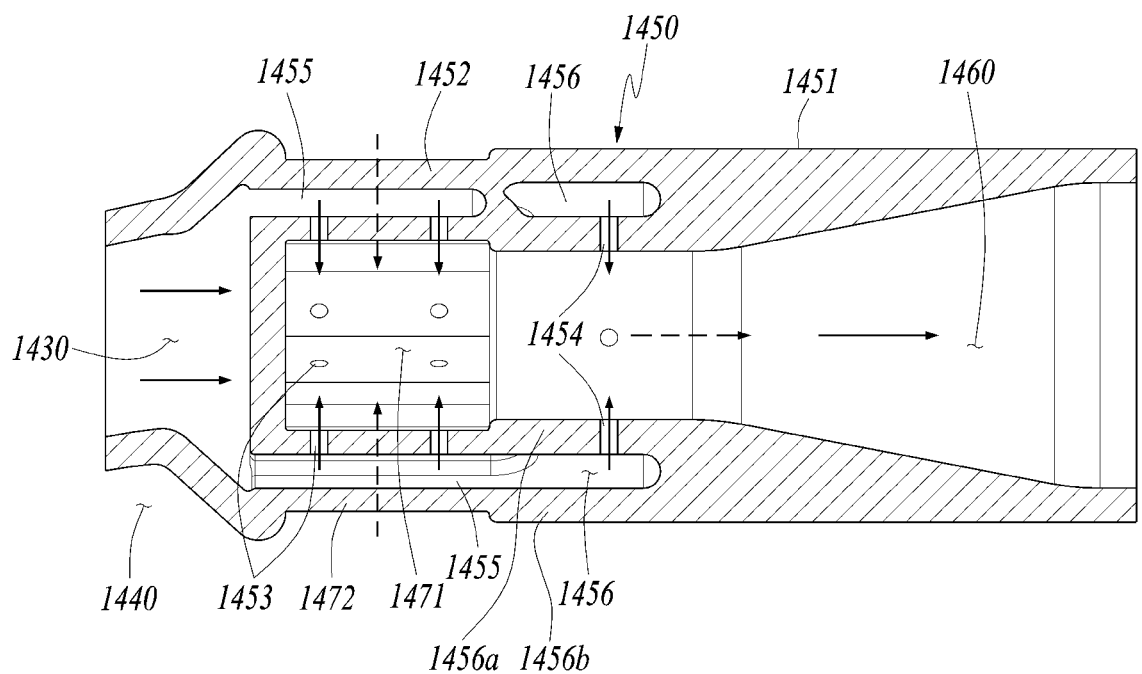
FIG. 8 is a longitudinal sectional view illustrating a fuel mixer of a nozzle module according to a second embodiment of the present disclosure.

FIG. 8 is a longitudinal sectional view illustrating a fuel mixer of a nozzle module according to a second embodiment of the present disclosure.

Hereinafter, a combustor nozzle 1220 according to a second embodiment of the present disclosure will be described in detail with referenced to FIG. 8. The combustor nozzle 1220 according to the second embodiment of the present disclosure is the same as the combustor nozzle 1220 according to the first embodiment of the present disclosure, except for a second fuel port 1454 and related components, so a redundant description thereof will be omitted.

In the combustor nozzle 1220 according to the second embodiment of the present disclosure, fuel ports 1453 and 1454 of the fuel mixer 1450 include a second fuel port 1454. According to an embodiment, the second fuel port 1454 is disposed on the inner side of the mixer body 1451 between the air inlet port 1470 and the extension 1460 to inject fuel into the mixing flow path 1480. A second fuel plenum 1456 communicating with the manifold may be formed in an internal space defined by the sidewall portion 1452 of the mixer body 1451. The sidewall portion 1452 having the second fuel plenum 1456 may have a double wall structure including a second fuel plenum inner wall 1456a and a second fuel plenum outer wall 1456b. The second fuel plenum inner wall 1456a is formed such that the inner surface of the second fuel plenum inner wall 1456a defines at least a part of the mixing flow path 1480. The second fuel plenum outer wall 1456b is formed such that the outer surface of the second fuel plenum outer wall 1456b defines the outer shape of the mixer body 1451. The second fuel plenum 1456 may be disposed between the first fuel plenum inner wall 1456a and the second fuel plenum outer wall 1456b. When the first fuel plenum 1455 is formed in the sidewall portion 1452 of the mixer body 1451, the second fuel plenum 1456 may be disposed between the first fuel plenum 1455 and the extension 1460 while communicating with the first fuel plenum 1455. Since the second fuel port 1454 communicates with the second fuel plenum 1456, fuel supplied to and filled in the second fuel plenum 1456 may be injected into the mixing flow path 1480.

According to an embodiment, the second fuel plenum 1456 may be formed in an annular shape. Specifically, the second fuel plenum 1456 may be formed in an annular shape to surround the mixing flow path 1480 in the sidewall portion 1452 of the mixer body 1451. According to an embodiment, the second fuel plenum 1456 may be formed in an annular shape around the entire circumference of the sidewall portion 1452, or may be formed in an annular shape only in some sections in the circumferential direction. When the second fuel plenum 1456 is formed only in a portion of the sidewall portion, a section of the sidewall portion without the second fuel plenum 1456 and a section of the side wall portion with the second fuel plenum 1456 may be alternately disposed in the circumferential direction. The annular second fuel plenum 1456 may be formed to extend long in the axial direction of the mixer body 1451. At this time, the second fuel port 1454 is disposed in communication with the annular second fuel plenum 1456 and the mixing flow path 1480.

According to an embodiment, the plurality of second fuel ports 1454 may be provided so as to be disposed along the circumferential direction and/or the axial direction of the mixer body 1451 on the inner side of the mixer body 1451. In addition, in some cases, the second fuel port 1454 may be disposed to be inclined so as to be deviated from the center of the mixer body 1451 or inclined along the axial direction. According to an embodiment, the second fuel port 1454 may be formed such that the direction of the injection through second fuel port 1454 is to be in a circumferentially oblique direction with respect to the radial direction from the center of the mixer body, thereby allowing the injection of the fuel from the second fuel port 1454 to swirl in the mixing flow path 1480. Alternatively, or in addition, according to an embodiment, the second fuel port 1454 may be formed such that the direction of the injection through the second fuel port 1454 is to be in an axially oblique direction with respect the radial direction from the center of the mixer body, thereby allowing the injection of the fuel from the second fuel port 1454 to join the mixing flow path 1480 more smoothly. In this way, when the second fuel ports 1454 are arranged in various ways, the mixing degree of air and fuel can be improved.

In addition, according to an embodiment, the second fuel plenum 1456 may be formed in an annular shape and the second fuel ports 1454 may be disposed in the circumferential or axial direction in communication with the annular second fuel plenum 1456, allowing the fuel to be more uniformly injected from the second fuel ports 1454.

Figure 9:
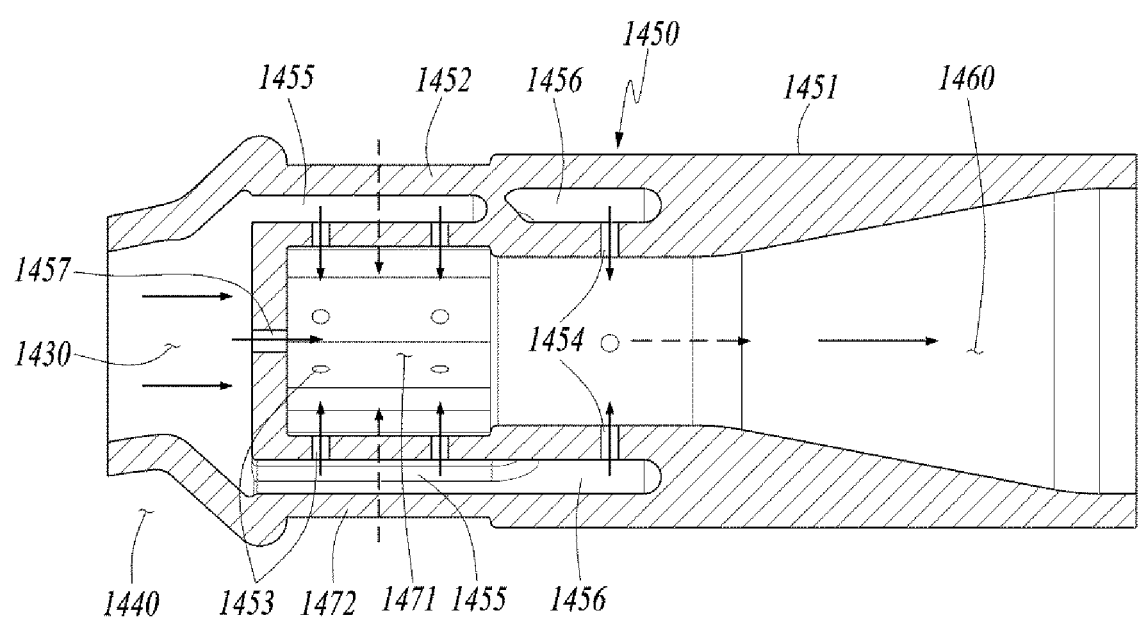
FIG. 9 is a longitudinal sectional view illustrating a fuel mixer of a nozzle module according to a third embodiment of the present disclosure.

FIG. 9 is a longitudinal sectional view illustrating a fuel mixer of a nozzle module according to a third embodiment of the present disclosure.

Hereinafter, a combustor nozzle 1220 according to a third embodiment of the present disclosure will be described in detail with referenced to FIG. 9. The combustor nozzle 1220 according to the third embodiment of the present disclosure is the same as the combustor nozzle 1220 according to the first or second embodiment of the present disclosure, except for a third fuel port 1457 and related components, so a redundant description thereof will be omitted.

The combustor nozzle 1220 according to the third embodiment of the present disclosure may include at least one third fuel port 1457. The third fuel port 1457 is formed at the front end of the mixer body 1451. At least one of the third fuel ports 1457 may be formed through the center of the front end of the mixer body 1451. At least one of the third fuel ports 1457 may be provided in an inclined manner.

According to an embodiment, a third fuel plenum (not shown) may be formed at the rear end of the manifold 1430, and the third fuel port 1457 may be formed to pass through the third fuel plenum (not shown) of the manifold 1430 and the internal mixing flow path 1480 of the mixer body 1451 so that the third fuel plenum and the internal mixing flow path 1480 may communicate with each other. Accordingly, fuel in the manifold 1430 may be injected into the mixing flow path 1480 through the third fuel port 1457.

When any one or more of the first fuel port 1453 and the second fuel port 1454 is further included, the first fuel port 1453 and/or the second fuel port 1454 may be configured in combination in addition to the third fuel port 1457. In this case, the equivalence ratio of air to fuel in the radial direction in the mixing flow path 1480 may be precisely adjusted. For example, the equivalence ratio may be adjusted to be higher or lower at any one region of the central portion of the mixing flow path 1480 and the outer portion of the central portion, or the equivalence ratio may be adjusted to be uniformly distributed at the central portion of the mixing flow path 1480 and the outer portion of the central portion.

Figure 10:
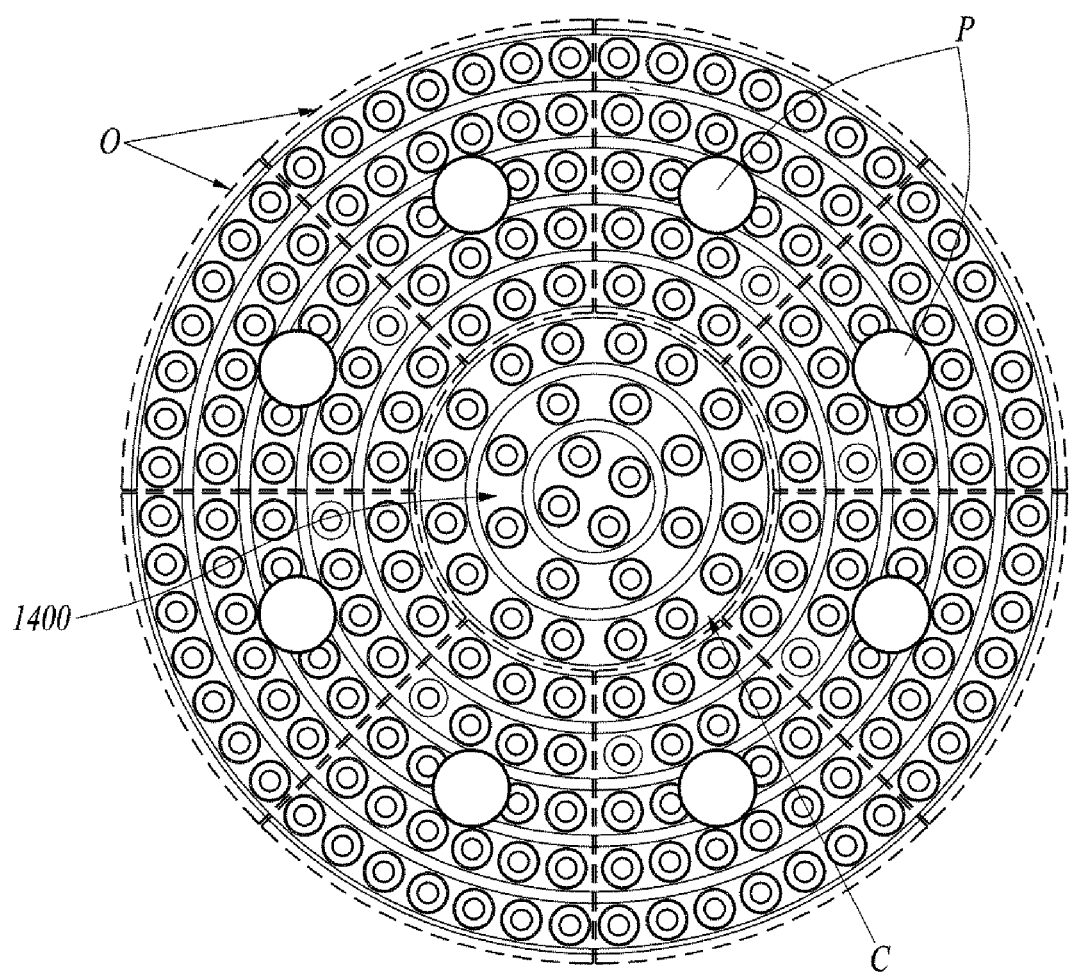
FIG. 10 is a front view illustrating a combustor nozzle according to a fourth embodiment of the present disclosure.
Figure 11:
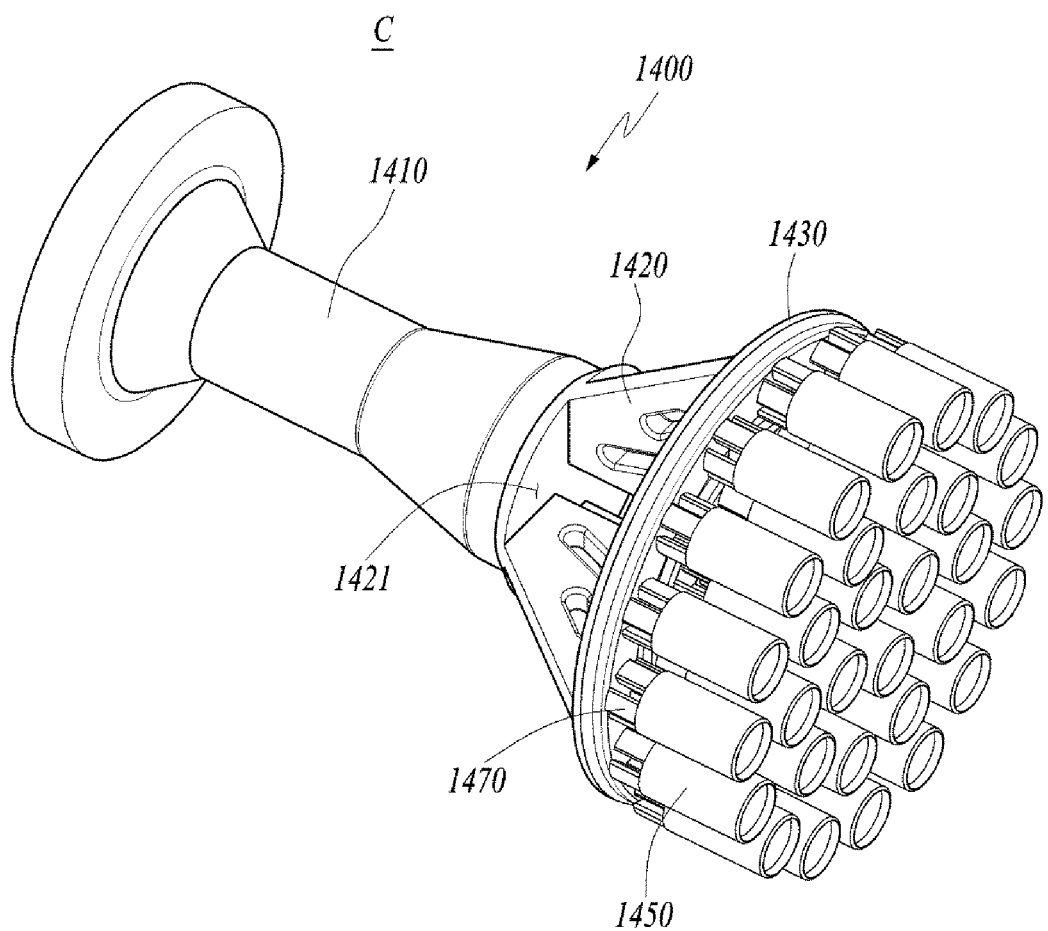
FIG. 11 is a perspective view illustrating a central nozzle module according to the fourth embodiment of the present disclosure.
Figure 12:
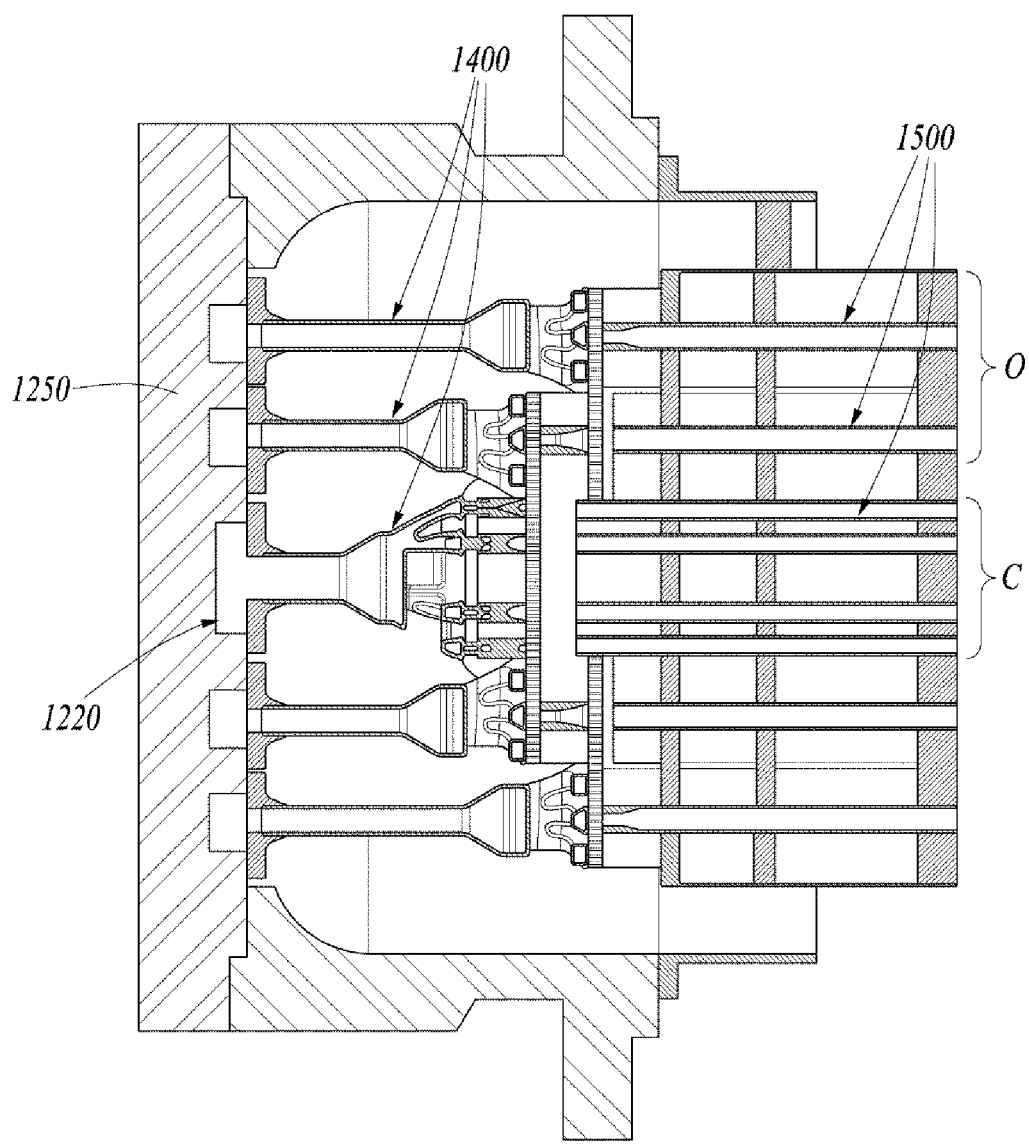
FIG. 12 is a cross-sectional view illustrating the combustor nozzle according to the fourth embodiment of the present disclosure.

FIG. 10 is a front view illustrating a combustor nozzle according to a fourth embodiment of the present disclosure, FIG. 11 is a perspective view illustrating a central nozzle module according to the fourth embodiment of the present disclosure, and FIG. 12 is a cross-sectional view illustrating the combustor nozzle according to the fourth embodiment of the present disclosure.

Hereinafter, a combustor nozzle 1220 according to a fourth embodiment of the present disclosure will be described in detail with referenced to FIGS. 10 to 12. The combustor nozzle 1220 according to the fourth embodiment of the present disclosure is the same as the combustor nozzle 1220 according to the first embodiment of the present disclosure, except for a central nozzle module C, so a redundant description thereof will be omitted.

In the combustor nozzle 1220 according to the fourth embodiment of the present disclosure, a plurality of nozzle modules 1400 are divided into outer nozzle modules O and a central nozzle module C. When the nozzle 1220 is viewed from the front, the outer nozzle modules O is disposed outside the nozzle 1220, and the central nozzle module C is a nozzle module 1400 disposed at the center of the nozzle 1220 and the center on the inner side of the outer nozzle modules O.

In the outer nozzle module O, when viewed from the front, a plurality of fuel mixers 1450 are disposed in a fan shape as a whole. Specifically, in the outer nozzle module O, the plurality of fuel mixers 1450 are arranged in the shape of a sector whole central portion is cut off. When the plurality of outer nozzle modules O is disposed along the circumferential direction, the outer nozzle modules O form an annular shape as a whole. In addition, although FIG. 10 illustrates that the outer nozzle module O is configured in one row in the radial direction, alternatively, the outer nozzle module may be configured in two or more rows. In this way, when the number of radial rows of the outer nozzle modules O is adjusted, there is an advantage that the size of the nozzle 1220 can be variously designed.

In the central nozzle module C disposed at the center of the annular shape formed by the outer nozzle modules O, when viewed from the front, the plurality of fuel mixers 1450 may be disposed in a circular shape as a whole. Accordingly, a plurality of manifolds 1430 of the central nozzle module C may be formed in an annular shape, and a plurality of air inlets 1421 of the branch pipe 1420 may also be uniformly formed along the circumferential direction.

According to an embodiment, the pilot burner module P may be disposed on at least one of the outer nozzle module O and the central nozzle module C. The pilot burner module P is a configuration for starting the nozzle 1220, and may be disposed at the center of the outer nozzle module O or the central nozzle module C in order to improve startability and control combustion vibration. In some cases, the pilot burner module P may be configured in the same manner as the nozzle module 1400, or may be configured in a premixed swirling flame method, a diffusion flame method, or a torch method.

According to an embodiment, the fuel mixers 1450 disposed in the central nozzle module C may be disposed further forward than the fuel mixers 1450 disposed in the outer nozzle modules O. The nozzle 1220 may further include an end cover 1250. Flanges (not shown) may be respectively disposed at the front ends of the fuel supply pipes 1410 of the central nozzle module C and the outer nozzle modules O, and each flange (not shown) may be coupled to the end cover 1250. Accordingly, each of the flanges (not shown) may be disposed on the same plane on the end cover 1250. According to an embodiment, the length of the fuel supply pipe 1410 of the central nozzle module C may be shorter than that of the fuel supply pipe 1410 of the outer nozzle modules O. When the outer nozzle modules O are composed of a plurality of circumferential rows, the length of each fuel supply pipe 1410 may be gradually lengthened from the inner side toward the outer side. The air having passed through the flow sleeve 1243 is diverted near the end cover 1250 and is supplied to the nozzle 1220. The air from the sleeve 1243 flows from the outer side toward the inner side, in other words, from the side of the outer nozzle modules O disposed on the outer side toward the side of the central nozzle module C disposed on the inner side. At this time, when the length of the fuel supply pipe 1410 of the central nozzle module C is shorter than the length of the outer nozzle module O, the air supplied to the central nozzle module C may flow smoothly without being disturbed by the outer nozzle module O, so that the air flow can be uniformly supplied to each of the nozzle modules 1400. As a result, the concentration deviation of fuel and air in each fuel mixer 1450 can be minimized.

While the embodiments of the present disclosure have been described, it will be apparent to those skilled in the art that various modifications and variations can be made in the present disclosure through addition, change, omission, or substitution of components without departing from the spirit of the invention as set forth in the appended claims, and such modifications and changes may also be included within the scope of the present disclosure. Also, it is noted that any one feature of an embodiment of the present disclosure described in the specification may be applied to another embodiment of the present disclosure.

The invention claimed is:

1. A combustor nozzle comprising a plurality of nozzle modules, each nozzle module comprising:
   a fuel supply pipe having an internal fuel flow path through which fuel flows from an upstream side to a downstream side based on a flow direction of the fuel in the internal fuel flow path;
   a plurality of manifolds communicating with the fuel supply pipe, parallelly extending in a circumferential direction, and arranged in a row in a radial direction so that air flow paths are respectively formed at positions therebetween; and
   a plurality of fuel mixers disposed along the circumferential direction at the downstream side of each manifold to receive the fuel from each manifold and inject the fuel, each of the plurality of fuel mixers comprising:
   a mixer body having an upstream end communicating with each manifold, a downstream end that is opened, and a mixing flow path through which a mixture of air and the fuel flow;
   an air inlet port including a plurality of air inlet slits formed on a lateral side of the mixer body so that the air from the air flow paths is introduced upstream of the mixing flow path;
   an extension located at a downstream side of the mixer body and whose flow cross-sectional area increases as the extension extends downstream of the mixing flow path;
   a first fuel plenum positioned between adjacent air inlet slits from among the plurality of air inlet slits and between a sidewall of the mixer body and the mixing flow path to receive the fuel from each manifold;
   a first fuel port formed on an inner side of the mixer body and injecting the fuel from the first fuel plenum toward the mixing flow path;
   a second fuel plenum formed in an internal space defined by a sidewall of the mixer body and positioned such that an upstream end of the second fuel plenum is positioned relatively downstream than a downstream end of the air inlet port; and
   a second fuel port formed on the inner side of the mixer body, positioned between the air inlet port and the extension in the flow direction and between the second fuel plenum and the mixing flow path to inject the fuel from the second fuel plenum into the mixing flow path.

2. The combustor nozzle according to claim 1, wherein each of the plurality of air inlet slits passes through the mixer body and extending in a longitudinal direction of the mixer body.

3. The combustor nozzle according to claim 2, wherein the air inlet port is provided with a plurality of guides to guide the air, and the air inlet slits are formed between the plurality of guides.

4. The combustor nozzle according to claim 3, wherein the guide is provided with a vane portion inclined with respect to the central direction to swirl the incoming air.

5. The combustor nozzle according to claim 4, wherein the first fuel port is disposed in the guide.

6. The combustor nozzle according to claim 1, wherein the first fuel port comprises a plurality of first fuel ports disposed in a circumferential direction and/or in an axial direction on the inner side of the mixer body.

7. The combustor nozzle according to claim 1, wherein the second fuel plenum is formed in an annular shape at the sidewall of the mixer body.

8. The combustor nozzle according to claim 1, wherein the second fuel port comprises a plurality of second fuel ports disposed in a circumferential direction and/or in an axial direction on the inner side of the mixer body.

9. The combustor nozzle according to claim 1, comprising a third fuel port passing through the center of the upstream end of the mixer body to allow each manifold and the mixing flow path to communicate with each other.

10. The combustor nozzle according to claim 1, wherein the nozzle module further comprises a branch pipe communicating with the fuel supply pipe and each manifold and having an air inlet opening communicating with the air inlet flow path.

11. The combustor nozzle according to claim 1, wherein the plurality of nozzle modules is disposed along the circumferential direction to form a circle as a whole, and the plurality of air inlet flow paths is arranged in a concentric annular shape as a whole.

12. The combustor nozzle according to claim 1, wherein the plurality of nozzle modules are composed of a plurality of outer nozzle modules circumferentially arranged in an annular shape as a whole, and a central nozzle module disposed at the center on the inner side of the outer nozzle modules.

13. The combustor nozzle according to claim 12, wherein a plurality of fuel mixers is arranged in a generally fan shape in the outer nozzle module, and another plurality of fuel mixers is arranged in a generally circular shape in the central nozzle module.

14. The combustor nozzle according to claim 1, wherein the plurality of nozzle modules includes at least two nozzle modules having a fan shape,
   wherein each manifold in the at least two nozzle modules has a concentric partial arc shape and the plurality of manifolds in the at least two nozzle modules form concentric circles as a whole.

15. A combustor comprising a combustor nozzle comprising a plurality of nozzle modules, and a duct assembly coupled to one side of the combustor nozzle and in which fuel and air are combusted and combustion gases are delivered to a turbine, each nozzle module comprising:
   a fuel supply pipe having an internal fuel flow path through which the fuel flows from an upstream side to a downstream side based on a flow direction of the fuel in the internal fuel flow path;
   a plurality of manifolds communicating with the fuel supply pipe, parallelly extending in a circumferential direction, and arranged in a row in a radial direction so that air flow paths are respectively formed at positions therebetween; and
   a plurality of fuel mixers disposed along the circumferential direction at the downstream side of each manifold to receive the fuel from each manifold and inject the fuel, each of the plurality of fuel mixers comprising:
   a mixer body having an upstream end communicating with each manifold, a downstream end that is opened, and a mixing flow path through which a mixture of the air and the fuel flow;
   an air inlet port including a plurality of air inlet slits formed on a lateral side of the mixer body so that the air from the air flow paths is introduced upstream of the mixing flow path;
   an extension located at a downstream side of the mixer body and whose flow cross-sectional area increases as the extension extends downstream of the mixing flow path;
   a first fuel plenum positioned between adjacent air inlet slits from among the plurality of air inlet slits and between a sidewall of the mixer body and the mixing flow path to receive the fuel from each manifold;

a first fuel port formed on an inner side of the mixer body and injecting the fuel from the first fuel plenum toward the mixing flow path;

a second fuel plenum formed in an internal space defined by a sidewall of the mixer body and positioned such that an upstream end of the second fuel plenum is positioned relatively downstream than a downstream end of the air inlet port; and a second fuel port formed on the inner side of the mixer body, positioned between the air inlet port and the extension in the flow direction and between the second fuel plenum and the mixing flow path to inject the fuel from the second fuel plenum into the mixing flow path.

16. The combustor according to claim 15, wherein the duct assembly comprises:

a liner having an internal combustion chamber; and a flow sleeve disposed to surround the liner to form an annular flow space therebetween with an end cover disposed on a front side thereof, wherein the combustor nozzle further comprises a plurality of guide tubes coupled to a front end of the liner and respectively disposed at positions corresponding to the plurality of fuel mixers.

17. The combustor according to claim 16, wherein each of the plurality of fuel mixers is coupled to one of the plurality of guide tubes, respectively.

18. The combustor according to claim 16, wherein the plurality of fuel mixers is disposed to be spaced apart from the plurality of guide tubes, respectively.

19. A gas turbine comprising a compressor compressing air introduced from the outside, a combustor mixing the compressed air compressed in the compressor and fuel and combusting an air-fuel mixture, and a turbine including a plurality of turbine blades to be rotated by combustion gases combusted in the combustor, the combustor comprising a combustor nozzle comprising a plurality of nozzle modules, and a duct assembly coupled to one side of the combustor nozzle and in which the fuel and the air are combusted and combustion gases are delivered to a turbine, each nozzle module comprising:

a fuel supply pipe having an internal fuel flow path through which the fuel flows from an upstream side to a downstream side based on a flow direction of the fuel in the internal fuel flow path;

a plurality of manifolds communicating with the fuel supply pipe, parallelly extending in a circumferential direction, and arranged in a row in a radial direction so that air flow paths are respectively formed at positions therebetween; and a plurality of fuel mixers disposed along the circumferential direction at the downstream side of each manifold to receive the fuel from each manifold and inject the fuel, each of the plurality of fuel mixers comprising:

a mixer body having an upstream end communicating with each manifold, a downstream end that is opened, and a mixing flow path through which a mixture of the air and the fuel flow;

an air inlet port including a plurality of air inlet slits formed on a lateral side of the mixer body so that the air from the air flow paths is introduced upstream of the mixing flow path;

an extension located at a downstream side of the mixer body and whose flow cross-sectional area increases as the extension extends downstream of the mixing flow path;

a first fuel plenum positioned between adjacent air inlet slits from among the plurality of air inlet slits and between a sidewall of the mixer body and the mixing flow path to receive the fuel from each manifold;

a first fuel port formed on an inner side of the mixer body and injecting the fuel from the first fuel plenum toward the mixing flow path;

a second fuel plenum formed in an internal space defined by a sidewall of the mixer body and positioned such that an upstream end of the second fuel plenum is positioned relatively downstream than a downstream end of the air inlet port; and a second fuel port formed on the inner side of the mixer body, positioned between the air inlet port and the extension in the flow direction and between the second fuel plenum and the mixing flow path to inject the fuel from the second fuel plenum into the mixing flow path.

* * * * *